(12) United States Patent
Suzuki et al.

(10) Patent No.: US 9,178,222 B2
(45) Date of Patent: Nov. 3, 2015

(54) TITANIUM FUEL CELL SEPARATOR

(75) Inventors: Jun Suzuki, Kobe (JP); Toshiki Sato, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 13/811,118

(22) PCT Filed: Sep. 1, 2010

(86) PCT No.: PCT/JP2010/064939
§ 371 (c)(1),
(2), (4) Date: Jan. 18, 2013

(87) PCT Pub. No.: WO2012/011200
PCT Pub. Date: Jan. 26, 2012

(65) Prior Publication Data
US 2013/0130153 A1    May 23, 2013

(30) Foreign Application Priority Data

Jul. 20, 2010  (JP) ................................. 2010-163403

(51) Int. Cl.
*H01M 8/02*  (2006.01)

(52) U.S. Cl.
CPC .......... *H01M 8/0206* (2013.01); *H01M 8/0213* (2013.01); *H01M 8/0228* (2013.01); *Y02E 60/50* (2013.01)

(58) Field of Classification Search
CPC ............ H01M 8/0206; H01M 8/0213; H01M 8/0228; Y02E 60/50
USPC .......................................... 429/514, 522, 535
See application file for complete search history.

(56) References Cited

U.S. PATENT DOCUMENTS

| | | | |
|---|---|---|---|
| 6,440,598 B1 | 8/2002 | Fukui et al. | |
| 2002/0093783 A1 | 7/2002 | Bendale et al. | |
| 2003/0235711 A1* | 12/2003 | Seido et al. | 428/660 |
| 2004/0170881 A1 | 9/2004 | Nakata | |
| 2004/0211943 A1* | 10/2004 | Okahara et al. | 252/511 |
| 2008/0160390 A1 | 7/2008 | Nakata | |
| 2009/0211667 A1 | 8/2009 | Suzuki et al. | |
| 2010/0035120 A1 | 2/2010 | Sato et al. | |

(Continued)

FOREIGN PATENT DOCUMENTS

| | | |
|---|---|---|
| CN | 101604756 A | 12/2009 |
| CN | 101617428 A | 12/2009 |

(Continued)

OTHER PUBLICATIONS

Japanese Office Action Issued Nov. 30, 2010 in JP Application No. 2010-163403 Filed Jul. 20, 2010 (with English translation).

(Continued)

*Primary Examiner* — Basia Ridley
*Assistant Examiner* — Heng Chan
(74) *Attorney, Agent, or Firm* — Oblon, McClelland, Maier & Neustadt, L.L.P.

(57) ABSTRACT

Disclosed is a titanium fuel cell separator having excellent conductivity and durability. In the disclosed titanium fuel cell separator (10), a carbon layer (2) is formed on the surface of a substrate (1) formed from pure titanium or a titanium alloy. The carbon layer (2) comprises graphite which is orientated so as to be parallel to the (002) plane of the carbon layer (2). The deposition amount of the carbon layer (2) is at least 2 μg/cm².

3 Claims, 5 Drawing Sheets

(56) References Cited

U.S. PATENT DOCUMENTS

2010/0151358 A1 6/2010 Sato et al.
2012/0088185 A1* 4/2012 Maeda et al. ................. 429/516

FOREIGN PATENT DOCUMENTS

| | | |
|---|---|---|
| EP | 2 597 711 A1 | 5/2013 |
| JP | 10 255823 | 9/1998 |
| JP | 2001 283872 | 10/2001 |
| JP | 2005-93172 | 4/2005 |
| JP | 2005 100697 | 4/2005 |
| JP | 2006-140095 A | 6/2006 |
| JP | 2006 278172 | 10/2006 |
| JP | 3904690 | 4/2007 |
| JP | 3904696 | 4/2007 |
| JP | 2007 207718 | 8/2007 |
| JP | 2008 198565 | 8/2008 |
| JP | 2008 204876 | 9/2008 |
| JP | 4147925 | 9/2008 |
| WO | WO 2008/114561 * | 9/2008 |
| WO | WO 2010119313 A1 * | 10/2010 .............. H01M 8/02 |

OTHER PUBLICATIONS

Written Opinion of the International Searching Authority Issued Nov. 30, 2010 in PCT/JP10/064939 Filed Sep. 1, 2010.

International Search Report Issued Nov. 30, 2010 in PCT/JP10/064939 Filed Sep. 1, 2010.

U.S. Appl. No. 13/788,376, filed Mar. 7, 2013, Suzuki, et al.

M.L. Perry, et al , "A Historical Perspective of Fuel Cell Technology in the $20^{th}$ Century", Journal of the Electrochemical Society, 149, (7) S59-S67 (2002).

Office Action issued Jan. 7, 2014 in EP Patent application No. 10855037.7.

* cited by examiner

TITANIUM FUEL CELL SEPARATOR

CROSS REFERENCE TO RELATED APPLICATIONS

The present application is a 35 U.S.C. §371 national stage patent application of International patent application PCT/JP2010/064939, filed on Sep. 1, 2010, published as WO 2012/011200 on Jan. 26, 2012, the text of which is incorporated by reference, and claims the benefit of the filing date of Japanese application no. 2010-163403, filed on Jul. 20, 2010, the text of which is also incorporated by reference.

TECHNICAL FIELD

The present invention relates to titanium fuel cell separators for use in fuel cells.

BACKGROUND ART

Fuel cells are capable of continuously generating electric power through continuous supply of a fuel (e.g., hydrogen) and an oxidizing agent (e.g., oxygen). Unlike primary batteries (such as dry batteries) and secondary batteries (such as lead storage batteries), the fuel cells generate electric power at a high power generating efficiency without being significantly affected by the scale of an electric-power-using system and do not generate much noise and vibrations. The fuel cells are therefore expected to be used as energy sources covering a wide variety of uses and scales. Specifically, the fuel cells have been developed as polymer electrolyte fuel cells (PEFCs), alkaline fuel cells (AFCs), phosphoric acid fuel cells (PAFCs), molten carbonate fuel cells (MCFCs), solid oxide fuel cells (SOFCs), and biofuel cells. Among them, polymer electrolyte fuel cells have been developed for use in fuel cell powered vehicles, domestic use fuel cells (domestic use co-generation systems), and mobile devices such as cellular phones and personal computers.

Such a polymer electrolyte fuel cell (hereinafter simply referred to as a "fuel cell") includes a stack of plural single cells, in which each single cell includes an anode, a cathode, and a polymer electrolyte membrane arranged between the anode and the cathode through the medium of electrodes called separators (also called bipolar plates). The separators have grooves acting as channels for a gas (e.g., hydrogen or oxygen). The fuel cell may exhibit an increasing output by increasing the number of cells per stack.

The separators for fuel cells (fuel cell separators) also act as parts for recovering a generated current to outside of the fuel cell. Materials for separators have to maintain a low contact resistance over a long duration during use as separators. The contact resistance is a resistance which causes voltage drop due to an interfacial phenomenon between the electrode and the separator surface. The separators also should have satisfactory corrosion resistance, because the inside of fuel cells is an acidic atmosphere.

To meet these requirements, separators milled from molded articles of graphite powders, and separators molded from a mixture of graphite and a resin have been proposed. These separators, however, have inferior strengths and toughness and may be broken upon application of vibration or impact, although they have satisfactory corrosion resistance. To avoid these disadvantages, various types of separators prepared from metallic materials have been proposed.

Exemplary metallic materials having both corrosion resistance and conductivity include gold (Au) and platinum (Pt). Specifically, customarily-studied techniques employ a metallic substrate made from a metallic material capable of having a small thickness and exhibiting satisfactory workability and high strengths, such as an aluminum alloy, stainless steel, nickel alloy, or titanium alloy, in which the metallic substrate is coated with a noble metal such as Au or Pt to give separators having both corrosion resistance and conductivity. The noble metal materials are, however, very expensive and cause higher cost.

As a possible solution to these issues, metallic separators without using noble metal materials have been proposed.

Typically, exemplary proposed separators include a separator including a substrate and a carbon film formed on a surface of the substrate by vapor deposition (see Patent Literature (PTL) 1); and a separator including a stainless steel substrate and graphite compression-bonded on a surface of the substrate (see PTL 2 and PTL 3).

Exemplary proposed separators further include a separator including a metallic substrate and, formed on a surface thereof, a carbon layer having a G/D ratio of 0.5 or less as measured by Raman spectroscopy (see PTL 4); and a separator including a metallic substrate and, formed on a surface thereof, a carbon layer including an amorphous carbon layer and a graphite region (see PTL 5).

CITATION LIST

Patent Literature

PTL 1: Japanese Patent No. 4147925
PTL 2: Japanese Patent No. 3904690
PTL 3: Japanese Patent No. 3904696
PTL 4: Japanese Unexamined Patent Application Publication (JP-A) No. 2007-207718
PTL 5: JP-A No. 2008-204876

SUMMARY OF INVENTION

Technical Problem

The techniques disclosed in PTL 1, 4, and 5, however, employ an amorphous carbon layer formed on a surface of a metallic substrate, may thereby suffer from insufficient environmental shielding properties (barrier properties), and often undergo oxidation and other reactions on the surface of the metallic substrate, which reactions cause decrease in conductivity. The separators according to the techniques disclosed in PTL 1, 4, and 5 may therefore have inferior conductivity and poor conductive durability. As used herein the term "conductive durability" refers to such a property as to maintain electrical conductivity over a long duration.

The techniques disclosed in PTL 2 and 3 employ a stainless steel substrate in the separators and may suffer from deterioration of the polymer electrolyte membrane due to dissolution of iron ions from the stainless steel substrate during usage. The carbon layer in the techniques disclosed in PTL 2 and 3 contains carbon in a low content, and the separators thereby have a large region from which the stainless steel substrate exposed. The separators thereby often suffer from the dissolution of iron ions and oxidation of the substrate surface and may undergo decrease in conductivity.

The present invention has been made under these circumstances, and an object thereof is to provide a titanium fuel cell separator which has superior conductivity and satisfactory durability.

Solution to Problem

The present inventors have found that a separator having superior conductivity and excellent durability can be obtained by employing pure titanium or a titanium alloy as a substrate because of having superior corrosion resistance, and coating one or both sides of the substrate with a carbon layer containing graphite oriented in a predetermined direction. The present invention has been made based on these findings.

To achieve the object, the present invention provides a titanium fuel cell separator which includes a substrate consisting of pure titanium or a titanium alloy; and a carbon layer formed on a surface (on one side or both sides) of the substrate, in which the carbon layer contains graphite oriented parallel to a (002) plane of the carbon layer, and the carbon layer is present in a mass of coating of 2 $\mu g/cm^2$ or more.

The titanium fuel cell separator according to the present invention employs pure titanium or a titanium alloy to constitute the substrate and can thereby have a smaller weight and better corrosion resistance. The employment of pure titanium or a titanium alloy as the substrate prevents dissolution of metal ions from the separator and avoids deterioration of the polymer electrolyte membrane, and also contributes to improvements in strengths and toughness of the substrate.

The carbon layer in the titanium fuel cell separator according to the present invention contains graphite oriented parallel to the (002) plane of the carbon layer and thereby helps the separator to exhibit better environmental shielding properties (barrier properties) to shield or isolate the substrate from the environment inside cells of the fuel cell. This suppresses occurrence of oxidation and other reactions at the interface between the substrate and the carbon layer, which reactions will adversely affect the conductivity. Specifically, this helps the separator to have better conductivity and conductive durability (such a property as to maintain conductivity over a long duration).

The carbon layer in the titanium fuel cell separator according to the present invention is present in a mass of coating of 2 $\mu g/cm^2$ or more and thereby covers a large area of the surface of the substrate. This increases an area where the environmental shielding properties (barrier properties) are ensured by the presence of the carbon layer and helps the separator to have satisfactory conductivity and conductive durability.

In a preferred embodiment, the titanium fuel cell separator according to the present invention further includes an intermediate layer between the substrate and the carbon layer, in which the intermediate layer contains titanium carbide in a form of grains ranging in a direction parallel to the carbon layer.

The titanium fuel cell separator according to the present invention, when further including an intermediate layer formed from conductive titanium carbide as in the embodiment, can have a low electric resistance at the interface between the substrate and the carbon layer and thereby exhibit better conductivity. In addition, the separator according to this embodiment may have better adhesion between the substrate and the carbon layer, because the titanium carbide is formed as a result of a reaction between the substrate and the carbon layer.

In another preferred embodiment of the titanium fuel cell separator according to the present invention, the carbon layer has an intensity ratio of G band peak to D band peak (G/D ratio) of 0.5 to 2 as measured by Raman spectroscopy.

The titanium fuel cell separator according to the present invention, when having an intensity ratio of G band peak to D band peak (G/D ratio) of the carbon layer within a predetermined specific range as in the embodiment, may have both satisfactory conductivity and good environmental shielding properties.

Advantageous Effects of Invention

The carbon layer in the titanium fuel cell separator according to the present invention contains graphite oriented parallel to the (002) plane of the carbon layer and thereby helps the separator to have better conductivity and durability.

The carbon layer in the titanium fuel cell separator according to the present invention is present in a mass of coating of 2 $\mu g/cm^2$ or more and thereby helps the separator to have conductivity and durability at certain levels.

The titanium fuel cell separator according to the present invention, when further including an intermediate layer containing titanium carbide, can have further better conductivity and better adhesion between the substrate and the carbon layer.

The titanium fuel cell separator according to the present invention, when having a G/D ratio within a predetermined specific range, can have both satisfactory conductivity and good environmental shielding properties.

BRIEF DESCRIPTION OF DRAWINGS

FIG. 1 depicts cross-sectional views illustrating titanium fuel cell separators according to embodiments, in which

In FIG. 6.

DESCRIPTION OF EMBODIMENTS

Embodiments of a titanium fuel cell separator according to the present invention will be illustrated with reference to the attached drawings according to necessity.

<<Titanium Fuel Cell Separator>>

Figure 1A:
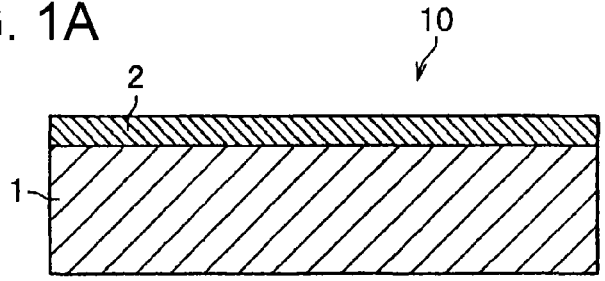
FIG. 1A is a cross-sectional view of a titanium fuel cell separator including a substrate and, on one side thereof, a carbon layer.
Figure 1B:
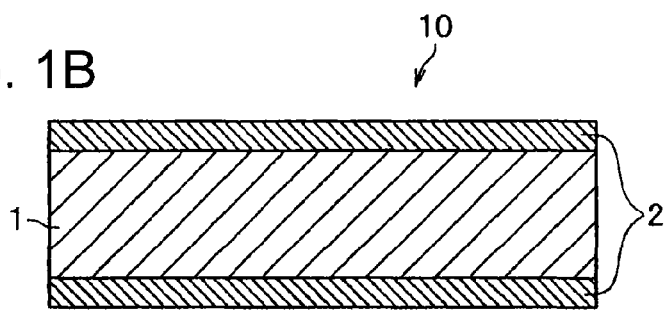
FIG. 1B is a cross-sectional view of a titanium fuel cell separator including a substrate and, respectively on both sides thereof, carbon layers.

A titanium fuel cell separator 10 (hereinafter also simply referred to as "separator" according to necessity) according to an embodiment includes a substrate 1; and a carbon layer 2 formed on a surface (on one side or both sides) of the substrate 1, as illustrated in FIGS. 1A and 1B.

Figure 1C:
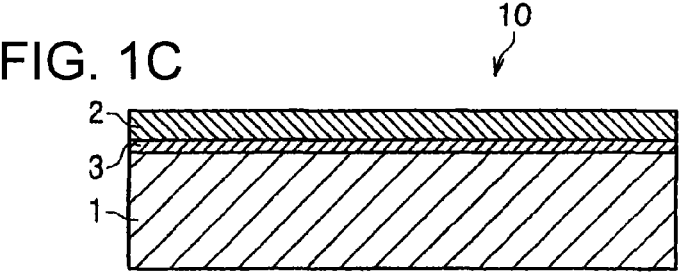
FIG. 1C is a cross-sectional view of titanium fuel cell separator including a substrate and, on one side thereof, an intermediate layer and a carbon layer.
Figure 1D:
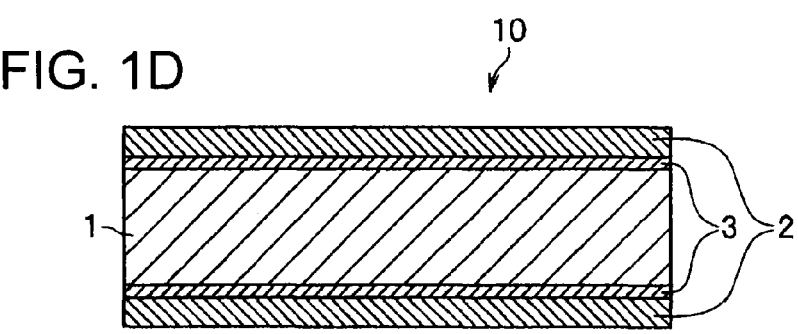
FIG. 1D is a cross-sectional view of a titanium fuel cell separator including a substrate and, respectively on both sides thereof, intermediate layers and carbon layers.

A separator 10 according to another embodiment may further include an intermediate layer 3 between the substrate 1 and the carbon layer 2, as illustrated in FIGS. 1C and 1D.

The substrate 1, the carbon layer 2, the intermediate layer 3, and a method for manufacturing the separator 10 will be illustrated in detail below.

<Substrate>

The substrate 1 in the separator 10 includes pure titanium or a titanium alloy. The substrate 1 therefore has a lighter weight and exhibits more satisfactory corrosion resistance than a substrate typically using a stainless steel. The substrate 1, if having a region or edge exposed without being covered with the carbon layer 2 (or with the carbon layer 2 and the intermediate layer 3), is protected from dissolution (deterioration) without danger of metal dissolution, because such exposed region or edge in the environment inside cells of the fuel cell is coated with a passive film formed on its surface. In addition, satisfactory strengths and toughness of pure titanium or a titanium alloy constituting the substrate helps the substrate 1 to have satisfactory strengths and toughness.

The substrate 1 may be prepared by a known process such as a process of melting and casting pure titanium or a titanium alloy to give an ingot, sequentially followed by hot rolling and cold rolling. The substrate 1 preferably undergoes annealed finish, but the substrate 1 may be finished in any form such as "annealed and pickled finish," "vacuum heat treatment finish," and "bright annealed finish."

The titanium material constituting the substrate 1 may have any chemical composition not limited. However, for easy cold rolling and better performance in subsequent stamping, preferred is a titanium material including oxygen (O) in a content of 1500 ppm or less (more preferably 1000 ppm or less), iron (Fe) in a content of 1500 ppm or less (more preferably 1000 ppm or less), carbon (C) in a content of 800 ppm or less, nitrogen (N) in a content of 300 ppm or less, and hydrogen (H) in a content of 130 ppm or less, with the remainder including titanium (Ti) and inevitable impurities. For example, a cold-rolled sheet of pure titanium according to Japanese Industrial Standards (JIS) Class 1 may be used as the substrate 1.

The substrate 1 has a thickness of preferably 0.05 to 1.0 mm. The substrate 1, if having a thickness of less than 0.05 mm, may not sufficiently have required strengths; and in contrast, the substrate 1, if having a thickness of more than 1.0 mm, may have insufficient workability.

<Carbon Layer>

The carbon layer 2 in the separator 10 includes carbon which has conductivity and corrosion resistance. The carbon layer 2 preferably covers the entire surface of the substrate 1, but does not always have to cover the entire surface. For conductivity and corrosion resistance at certain levels, the carbon layer 2 may cover 40% or more, and preferably 50% or more, of the surface of the substrate 1. A passive film of titanium is formed on a region of the surface of the substrate 1 not coated with the carbon layer 2, and this contributes to suppression of oxidation and other reactions on the substrate 1.

The carbon layer 2 may be formed by rolling a substrate 1 bearing a carbon powder on its surface, while the formation process of the carbon layer 2 will be described in detail later.

The carbon layer 2 contains graphite 23 oriented parallel to a (002) plane 21 of the carbon layer 2. The graphite 23, as illustrated at the atomic level, refers to a hexagonal sheet-like crystal including a multiplicity of graphene sheets 24 each having a hexagonal lattice, having a sheet-form, and being stacked and layered on one another (see FIG. 3).

Figure 2:
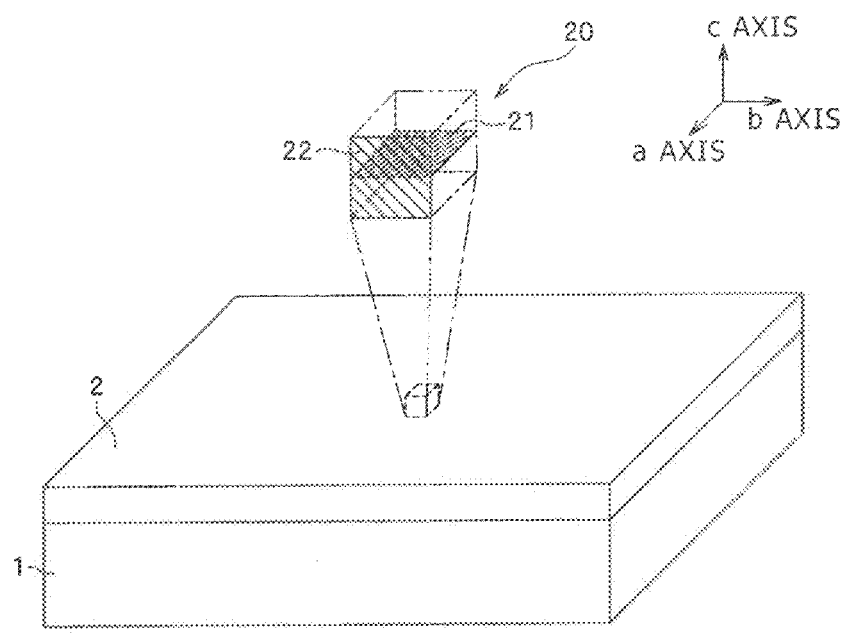
FIG. 2 depicts a schematic diagram for illustrating a crystal lattice plane of a carbon layer in a titanium fuel cell separator according to an embodiment.

As used herein the term "(002) plane 21" of the carbon layer 2 refers to a plane of a crystal lattice (unit lattice) 20 indicated by Miller indices with the a-axis direction (machine (rolling) direction of the carbon layer 2), b-axis direction (cross direction), and c-axis direction (thickness direction) as crystallographic axes and is a plane positioned one half in the c-axis direction and parallel to the a-axis direction and the b-axis direction (see FIG. 2).

Figure 3:
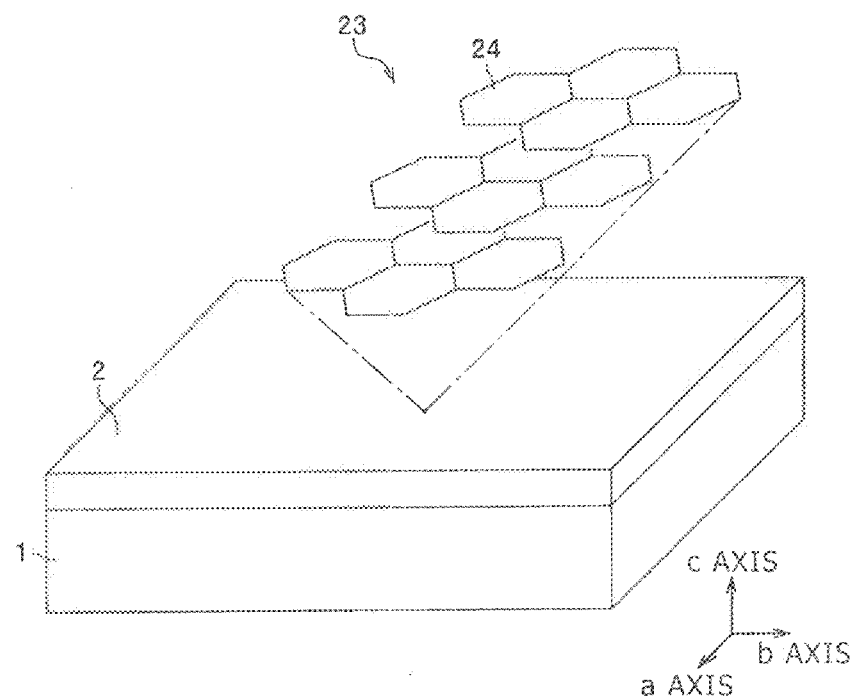
FIG. 3 depicts a schematic diagram for illustrating graphite contained in a carbon layer of a titanium fuel cell separator according to an embodiment.

Specifically, when the graphite 23 is oriented parallel to the (002) plane 21 of the carbon layer 2, the graphene sheets 24 constituting the graphite 23 are regularly stacked parallel to the surface of the substrate 1, as illustrated in FIG. 3. In this state, the c axis of the graphite 23 is perpendicular to the surface of the substrate 1.

The graphite 23, when contained in the carbon layer 2, contributes to better environmental shielding properties (barrier properties) for shielding the substrate 1 from the environment inside cells of the fuel cell. This suppresses oxidation and other reactions at the interface between the substrate 1 and the carbon layer 2, which reactions will adversely affect the conductivity.

(X-ray Diffractometric Analysis of Carbon Layer)

When the graphite 23 is oriented parallel to the (002) plane 21 of the carbon layer 2, this state refers to a state where the carbon layer 2 has a peak intensity of the (002) plane 21 as much as 3 times or more the peak intensity of a (100) plane 22, as measured by X-ray diffractometry (X-ray crystallography).

With an increasing amount of graphite oriented parallel to the (002) plane 21 in the carbon layer 2, the peak intensity of the (002) plane 21 increases with respect to the peak intensity of the (100) plane 22 as measured by X-ray diffractometry.

If the peak intensity of the (002) plane 21 is less than 3 times the peak intensity of the (100) plane 22, the graphite oriented parallel to the (002) plane 21 is present in a small content and may fail to help the carbon layer 2 to exhibit sufficient environmental shielding properties (barrier properties). This may cause oxidation and other reactions to occur readily at the interface between the substrate 1 and the carbon layer 2, to adversely affect the conductivity. To avoid these, the carbon layer 2 should have a peak intensity of the (002) plane 21 as much as 3 times or more the peak intensity of the (100) plane 22, as measured by X-ray diffractometry (X-ray crystallography).

X-ray diffractometric analysis may be performed according to a known X-ray diffractometry technique with a known X-ray diffractometer. Specifically, peak intensities may be determined by measuring, on the surface of the carbon layer 2, an X-ray diffraction intensity from the (002) plane 21 and an X-ray diffraction intensity from the (100) plane 22, and comparing these X-ray diffraction intensities.

(Raman Spectroscopic Analysis of Carbon Layer)

The carbon layer 2 preferably has an intensity ratio of G band peak to D band peak (G/D ratio) of from 0.5 to 2 as measured by Raman spectroscopy.

In the carbon layer 2, the D band peak intensity increases with an increasing abundance ratio of $sp^2$ hybrid orbital; whereas G band peak intensity increases with an increasing abundance ratio of spa hybrid orbital. Graphene sheets 24 as illustrated in FIG. 3 are generally formed by the $sp^2$ hybrid orbital. The carbon layer 2, when containing graphene sheets 24 in a larger amount, may have a lower intensity ratio of G band peak to D band peak (G/D ratio). A carbon layer 2, when having a graphite structure with an intense G band peak tends to exhibit high conductivity. In contrast, a carbon layer 2 containing a large amount of graphene sheets 24 is preferred for environmental shielding properties. Accordingly, the carbon layer 2 preferably has an intensity ratio of G band peak to D band peak (G/D ratio) within a specific range, i.e., in the range of 0.5 to 2 for exhibiting both satisfactory conductivity and good environmental shielding properties.

Figure 5:
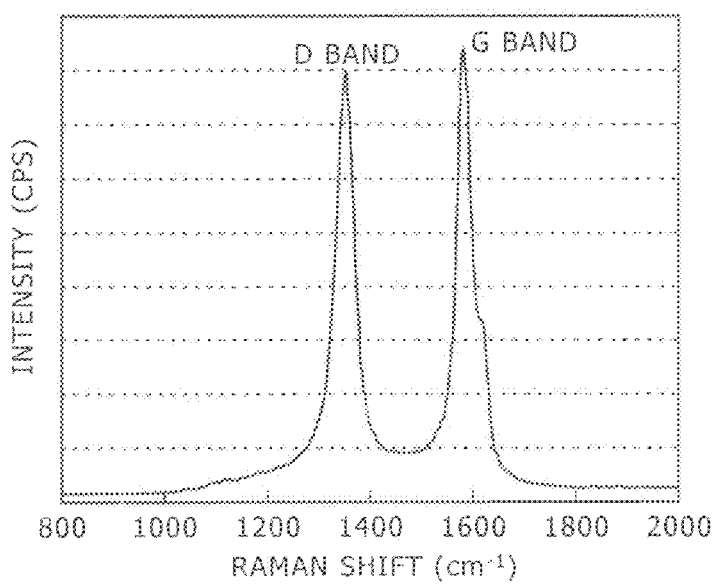
FIG. 5 depicts a result (profile) of Raman spectroscopy of a specimen as a working example (Example).

As used herein the term "D band peak" refers to a maximum peak intensity of D band having a peak in the vicinity of 1350 $cm^{-1}$; and the term "G band peak" refers to a maximum peak intensity of G band having a peak in the vicinity of 1590 $cm^{-1}$ (see FIG. 5).

Raman spectroscopic analysis may be performed typically with a known Laser Raman spectroscope.

The mass of coating of the carbon layer 2 on a surface of the substrate 1 affects the conductive durability (such a property as to maintain conductivity over a long duration). The carbon layer 2, if present in a mass of coating of less than 2 $\mu g/cm^2$, may cover the substrate 1 in a smaller area and may thereby fail to exhibit sufficient environmental shielding properties even when the graphite 23 is oriented. This may cause the substrate 1 to be oxidized in a larger area in the environment inside cells of the fuel cell, resulting in insufficient conductive durability. To avoid these, the carbon layer 2 is present in a mass of coating of 2 µg or more and preferably 5 µg or more per square centimeter of the surface of the substrate 1.

Though upper limit in mass of coating is not critical, the carbon layer 2 is enough to be present in a mass of coating of 1000 µg/cm² or less, because the carbon layer 2, if present in a mass of coating of more than 1000 µg/cm², may not further contribute to improvements in conductive durability.

The content of graphite in the carbon layer 2 (content of graphite oriented parallel to the (002) plane 21 of the carbon layer 2) may be controlled typically by the rolling reduction in a cold rolling step described later; and the type and size of a carbon powder to be applied to the substrate 1 in a carbon coating step described later.

The amount of carbon (coating mass of carbon) on the surface of the substrate 1 may be controlled by the amount of the carbon powder to be applied to the substrate 1 in the carbon powder coating step.

<Intermediate Layer>

The separator preferably further includes an intermediate layer 3 between the substrate 1 and the carbon layer 2. The intermediate layer 3 particularly preferably includes granular titanium carbide formed as a result of a reaction between the substrate 1 and the carbon layer 2. Such granular titanium carbide has conductivity and thereby helps the separator to have a lower electric resistance at the interface between the substrate 1 and the carbon layer 2 and to exhibit better conductivity. In addition, the intermediate layer 3, as being formed by a reaction between the substrate 1 and the carbon layer 2, may contribute to better adhesion between the substrate 1 and the carbon layer 2.

As used herein the term "granular" (in the form of grains) refers to that the substance is present in the form typically of any of spheres, spheroidal solids, ellipsoids, and polyhedrons.

Figure 6B:
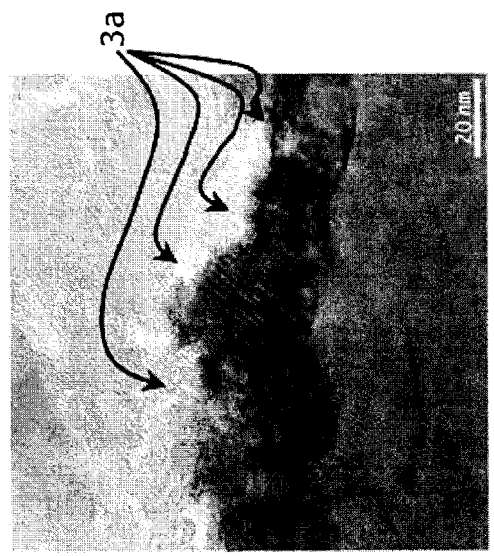
FIG. 6B is an enlarged view of Region A in FIG 6A.
Figure 6A:
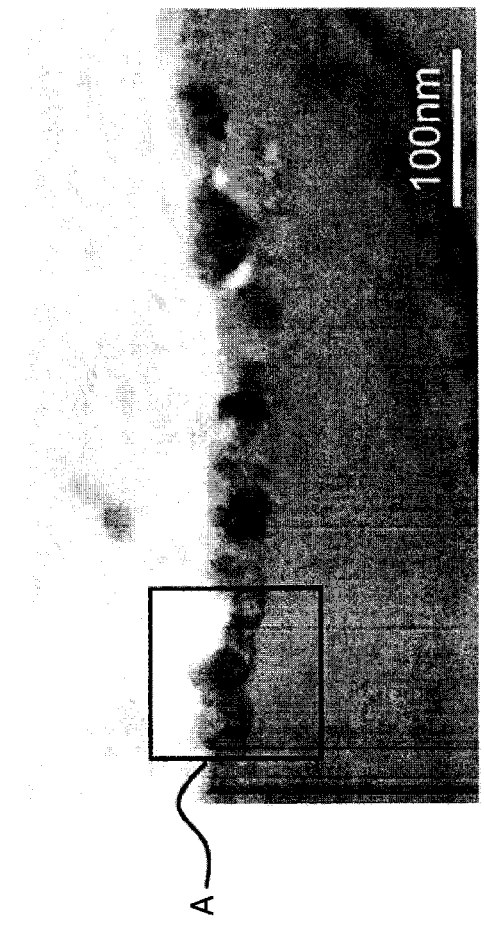
FIG. 6A depicts a referential drawing as a photograph of a cross section of a titanium fuel cell separator according to an embodiment, as observed with a transmission electron microscope (TEM)

The above-mentioned intermediate layer 3 is formed by irregular, ranging titanium carbide grains. This is demonstrated by the photograph (FIG. 6) of the cross section of a separator 10 as observed with a transmission electron microscope (TEM), indicating that the titanium carbide 3a is in the form of not a film but grains.

The intermediate layer 3 is preferably formed at the entire interface between the substrate 1 and the carbon layer 2, but may be formed in an area of 50% or more of the interface for ensuring adhesion at certain level.

When the intermediate layer 3 is a layer including granular titanium carbide formed as a result of a reaction between the substrate 1 and the carbon layer 2, the titanium carbide grains preferably have an average size (diameter) of 5 nm or more. Titanium carbide grains having an average size of less than 5 nm may not contribute to sufficient adhesion between the substrate 1 and the carbon layer 2.

Though upper limit in average size is not critical, the titanium carbide grains are enough to have an average size of 100 nm or less, because the titanium carbide grains, if having an average size of more than 100 nm, may not further contribute to improvements in adhesion.

The average size of the titanium carbide grains may be measured by observing a cross section of the substrate 1 and the carbon layer 2 typically with a transmission electron microscope. As used herein the term "size (diameter)" of a titanium carbide grain, when being not spherical, refers to an arithmetic mean of a major axis and a minor axis of the grain. Also as used herein the term "average (grain) size" refers to an average of sizes of plural grains (e.g., 20 grains) of titanium carbide.

Next, a method for manufacturing the separator 10 will be illustrated.

<<Method for Manufacturing Separator>>

Initially, a carbon powder is applied to a surface (one side or both sides) of the substrate 1 (carbon powder coating step). The carbon powder may be applied according to any procedure not limited, but the carbon powder may be applied as intact as a powder directly to the substrate 1, or may be applied by dispersing the carbon powder in an aqueous solution typically of methylcellulose or in a coating material containing a resin component to give a slurry, and applying the slurry to the substrate 1.

The carbon powder to be applied to a surface of the substrate 1 may be a carbon powder having a particle size (diameter) of 0.5 to 100.0 µm. A carbon powder having a particle size of less than 0.5 µm may not sufficiently undergo orientation to the direction of the (002) plane 21 in the rolling step. In contrast, a carbon powder having a size of more than 100.0 µm may not sufficiently adhere to the surface of the substrate 1 in the carbon coating step and the rolling step.

The way to apply the carbon powder to the substrate 1 is not limited to the above process. Exemplary possible processes include a process of kneading a carbon powder with a resin to give a film containing the carbon powder, and applying the film to the substrate 1; a process of knocking a carbon powder into the surface of the substrate through shot blasting to allow the substrate 1 surface to bear the carbon powder; and a process of mixing a carbon powder with a resin powder to give a mixture, and applying the mixture to the substrate 1 through cold spraying.

Figure 7:
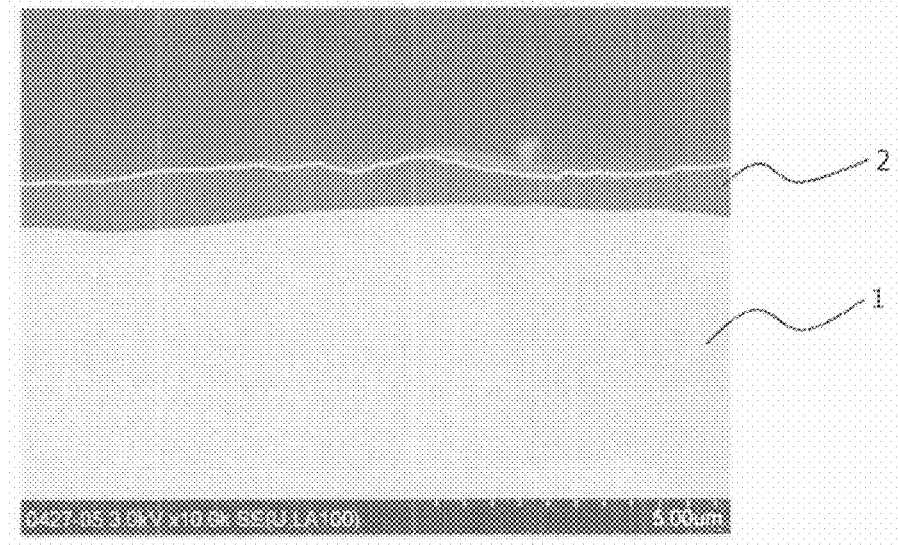
FIG. 7 depicts a referential drawing as a photograph of a cross section of a substrate and a carbon layer after coating the substrate with a carbon powder and subsequent rolling, as observed with a scanning electron microscope (SEM).

After the carbon powder coating step, the work is cold-rolled for compression bonding of the carbon powder to the substrate 1 (cold rolling step). By passing through the cold rolling step, the carbon powder is pressed and bonded as the carbon layer 2 to the surface of the substrate 1. The carbon powder adhered to the surface of the substrate 1 acts also as a lubricant, and this eliminates the need of using a lubricant upon cold rolling. After rolling, the carbon powder is not in the form of particles but in the form of a thin layer adhered to the substrate 1 so as to cover the substrate 1 on its surface (see the scanning electron photomicrograph (SEM) in FIG. 7).

For the preparation of a carbon layer 2 containing graphite oriented parallel to the (002) plane 21 of the carbon layer 2, rolling in the cold rolling step may be performed to a total rolling reduction of 0.1% or more.

Rolling to a total rolling reduction of 0.1% or more may increase the content of graphite oriented parallel to the (002) plane 21 of the carbon layer 2 and may help the carbon layer 2 to exhibit sufficient environmental shielding properties (barrier properties) to shield the substrate 1 from the environment inside cells of the fuel cell. The total rolling reduction is preferably 0.5% or more, and more preferably 1% or more.

The term "rolling reduction" refers to a value calculated from a change in thickness between before and after cold rolling and is calculated according to the following expression:

$$\text{Rolling reduction} = (t0 - t1)/t0 \times 100$$

wherein t0 represents the initial thickness after the carbon powder coating step; and t1 represents the thickness after the rolling.

When a layer including granular titanium carbide is to be formed as the intermediate layer 3 through a reaction between the substrate 1 and the carbon layer 2, a heat treatment is performed in a non-oxidative atmosphere (heat treatment step) after the cold rolling step. The heat treatment is preferably performed at a temperature of from 300° C. to 850° C. A heat treatment performed at a temperature of lower than 300° C. may cause the reaction between carbon and titanium to proceed slowly and may cause the separator to be produced with inferior productivity, because formation of granular titanium carbide takes a long time. In contrast, a heat treatment performed at a temperature of higher than 850° C. may probably cause phase transformation of titanium and may cause the separator to be changed in mechanical properties. The heat treatment may be performed for a duration of 0.5 to 60 minutes. The heat treatment time is preferably suitably controlled depending on the temperature such that the heat treatment is performed for a long time at a low temperature; and is performed for a short time at a high temperature.

As used herein the term "non-oxidative atmosphere" refers to an atmosphere having a low partial pressure of oxidative gas, such as an atmosphere having an oxygen partial pressure of $1.3 \times 10^{-3}$ Pa or lower.

The manufacturing method may further include a drying step between the carbon powder coating step and the cold rolling step. In the drying step, the substrate 1 bearing the carbon powder adhered to its surface is dried typically by blowing.

EXAMPLES

The titanium fuel cell separator according to the present invention will be illustrated in detail below, with reference to examples satisfying conditions specified in the present invention, and comparative examples not satisfying the conditions.

First Experimental Example

<Specimen Preparation>

Pure titanium of JIS Class 1, which had undergone annealed and picked finish, was used as a substrate. The pure titanium had a chemical composition including oxygen (O) in a content of 450 ppm, iron (Fe) in a content of 250 ppm, and nitrogen (N) in a content of 40 ppm, and further including titanium (Ti) and inevitable impurities. The titanium substrate had a thickness of 0.5 mm. Carbon powders used herein were graphite having an average particle size of 5 μm or 10 μm and four-nines purity; and acetylene black having an average particle size of 50 nm and four-nines purity. The titanium substrate was obtained by subjecting a titanium material subsequently to melting step, casting step, hot rolling step, and cold rolling step according to known procedures.

The carbon powder was dispersed to a predetermined concentration in a 1 percent by weight aqueous methylcellulose solution to give a slurry. The slurry was applied to both sides of the titanium substrate, followed by air drying.

A roll-to-roll gap was adjusted so as to allow a rolling reduction per one pass to be a predetermined value, and cold rolling was performed in two or more passes to a predetermined total rolling reduction. Reduction rolls used herein were not coated with a lubricating oil.

Next, a heat treatment was performed at a predetermined temperature in a non-oxidative atmosphere (at an oxygen partial pressure of $1.3 \times 10^{-3}$ Pa) for a predetermined time and thereby yielded specimens. Some specimens did not undergo the heat treatment.

The thus-prepared specimens were subjected to measurement of graphite oriented parallel to the (002) plane, measurements of D band peak intensity and G band peak intensity, measurement of coating mass of carbon, evaluation of contact resistance, and evaluation of durability.

[Measurement of Graphite Oriented Parallel to (002) Plane]

A peak intensity of the (002) plane and a peak intensity of the (100) plane in the carbon layer were measured on the prepared specimens using an X-ray diffractometer (Horizontal Sample Mount X-Ray Diffraction System, supplied by Rigaku Corporation, measurement angle: 20° to 100°). The peak intensity of the (002) plane was measured at a measurement angle 2θ of 26.4°, and the peak intensity of the (100) plane was measured at a measurement angle 2θ of 42.7°.

A specimen having a peak intensity of the (002) plane as much as 3 times or more the peak intensity of the (100) plane in the carbon layer was judged as containing graphite oriented parallel to the (002) plane of the carbon layer ("present" in (002) plane orientation), which peak intensities were measured by X-ray diffractometry (X-ray crystallography).

[Measurements of D Band Peak Intensity and G Band Peak Intensity]

Each of the specimens was subjected to Raman spectrometry of carbon using a laser Raman microprobe spectrometer. A D band peak was observed at about 1350 cm$^{-1}$, and a G band peak was observed at about 1590 cm$^{-1}$. An intensity ratio of G band peak to D band peak (G/D ratio) was determined according to a computational expression of: (G band peak intensity)/(D band peak intensity)

A specimen having an intensity ratio of G band peak to D band peak (G/D ratio) of 0.5 to 2 was judged as including a carbon layer suitable to be employed in the present invention.

[Measurement of Coating Mass of Carbon]

A test specimen having a predetermined size was cut out from each of the above-prepared specimens and weighed. The test specimen was subjected to ultrasonic cleaning with pure water to remove the carbon layer therefrom. The test specimen after removal of the carbon layer was dried and weighed to determine a weight loss. The weight loss was divided by the surface area (except for edges) of the test specimen to give a coating mass of carbon (μg/cm$^2$).

[Contact Resistance Measurement]

Figure 4:
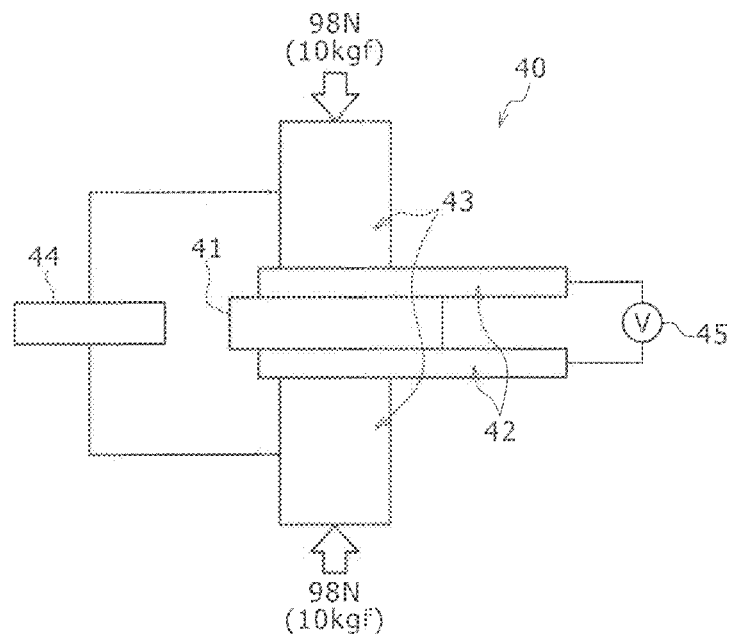
FIG. 4 depicts a schematic diagram of a contact resistance measuring instrument for use in contact resistance measurement and adhesion evaluation in working examples.

Each of the above-prepared specimens was subjected to measurement of contact resistance using a contact resistance measuring instrument 40 illustrated in FIG. 4. Initially, the specimen 41 was sandwiched between two carbon cloths 42 and 42, outer sides of which were further sandwiched between two copper electrodes 43 and 43 each having a contact area of 1 cm$^2$, and the specimen was pressurized from both sides each with a load of 98 N (10 kgf). A current of 7.4 mA was then applied through the copper electrode 43 and 43 using a direct-current power source 44, and a voltage applied between the carbon cloths 42 and 42 was measured with a voltmeter 45 to determine a contact resistance (initial contact resistance).

A specimen having a contact resistance of 10 mΩ·cm$^2$ or less was judged as having good conductivity, whereas a specimen having a contact resistance of more than 10 mΩ·cm$^2$ was judged as having poor conductivity.

[Durability Evaluation]

Each of the prepared specimens was subjected to a durability evaluation (durability test). Initially, a specimen was immersed in an aqueous sulfuric acid solution (10 mmol/L) having a solution volume to specimen area ratio of 20 ml/cm$^2$ at 80° C. for 1000 hours. The specimen was then retrieved from the aqueous sulfuric acid solution, washed, dried, and a contact resistance thereof was measured by the above procedure. A specimen having a contact resistance after immersion in sulfuric acid (after durability test) (contact resistance after durability test) of 15 mΩ·cm$^2$ or less was judged as having good durability, whereas a specimen having a contact resistance after durability test of more than 15 mΩ·cm$^2$ was judged as having poor durability.

Table 1 indicates the type and average particle size of carbon powder used in respective specimens, preparation conditions, and measurement results on (002) plane orientation, G/D ratio as determined by Raman spectroscopy, coating mass of carbon, initial contact resistance, and contact resistance after durability test. The "rolling reduction (%)" in Table 1 refers to a total rolling reduction (%) and is a value calculated from a change in thickness of the titanium substrate 1 between before and after cold rolling.

TABLE 1

| Specimen number | Carbon powder | | Preparation conditions | | | (002) Plane orientation | G/D ratio determined by Raman spectroscopy | Coating mass of carbon (μg/cm²) | Initial contact resistance (mΩ·cm²) | Contact resistance after durability test (mΩ·cm²) | Remarks |
|---|---|---|---|---|---|---|---|---|---|---|---|
| | Type of carbon powder | Average particle size | Rolling reduction (%) | Heat treatment | | | | | | | |
| 1 | graphite | 10 μm | 75 | 700° C. for 5 min | | present | 1.1 | 105 | 2.8 | 3.2 | Example |
| 2 | graphite | 10 μm | 50 | 700° C. for 5 min | | present | 1.2 | 5 | 3.0 | 9.8 | Example |
| 3 | graphite | 5 μm | 15 | 700° C. for 5 min | | present | 1.5 | 20 | 3.4 | 5.1 | Example |
| 4 | graphite | 5 μm | 2 | 700° C. for 5 min | | present | 1.8 | 180 | 3.7 | 9.6 | Example |
| 5 | graphite | 10 μm | 75 | 500° C. for 5 min | | present | 0.9 | 82 | 3.5 | 4.6 | Example |
| 6 | graphite | 10 μm | 50 | 300° C. for 10 min | | present | 1.1 | 50 | 4.2 | 7.7 | Example |
| 7 | graphite | 10 μm | 50 | 700° C. for 5 min | | present | 1.3 | 1.5 | 4.8 | 26.9 | Comparative Example |
| 8 | acetylene black | 50 μm | 50 | 300° C. for 5 min | | absent | 0.4 | 2.3 | 8.2 | 87.2 | Comparative Example |
| 9 | acetylene black | 50 μm | 65 | 400° C. for 5 min | | absent | 0.4 | 10 | 7.8 | 42.5 | Comparative Example |
| 10 | acetylene black | 50 μm | 50 | not performed | | absent | 0.3 | 52 | 5.9 | 63.8 | Comparative Example |

Specimens Nos. 1 to 6 each included a carbon layer satisfying conditions specified in the present invention, thereby had a low initial contact resistance, and exhibited good conductivity. In addition, Specimens Nos. 1 to 6 each had a contact resistance after durability test within the acceptable range and exhibited good durability.

By contrast, Specimen No. 7 included oriented graphite in the carbon layer, but had an increased contact resistance after durability test and exhibited poor durability due to a small coating mass of carbon.

Specimens Nos. 8 to 10 included a carbon layer without a graphite structure and indicated no orientation parallel to the (002) plane. In addition, Specimens Nos. 8 to 10 each had an increased contact resistance after durability test, exhibited poor durability, and were found to be unsuitable as materials for fuel cell separators.

Specimen No. 1 was subjected to Raman spectroscopy to give a profile illustrated in FIG. 5. Specimen No. 1 had an intensity ratio of G band peak to D band peak (G/D ratio) of 1.1, i.e., within the preferred range.

Specimens Nos. 2 to 7 also had G/D ratios within the preferred range, whereas Specimens Nos. 8 to 10 had G/D ratios out of the preferred range.

The results in Table 1 demonstrate that conductivity and durability may be improved by the presence of a carbon layer containing graphite oriented parallel to the (002) plane of the carbon layer (namely, having a G/D ratio of 0.5 to 2) and being present in a coating mass of 2 μg/cm² or more.

Second Experimental Example

Specimens were prepared by the procedure of First Experimental Example, using a titanium substrate of the same type and same size as with one used in First Experimental Example and using a graphite (graphite having an average particle size of 5 μm and four-nines purity used in Specimens Nos. 11 to 15).

The resulting specimens were subjected to determination of intermediate layer, measurement of coating mass of carbon, and evaluation of carbon layer adhesion according to the following methods.

[Intermediate Layer Determination]

A cross section of a specimen surface layer was processed using an ion beam processing instrument (Hitachi Focused Ion Beam System FB-2100) to give a sample, the sample cross section was observed with a transmission electron microscope (TEM: Hitachi Field Emission Analytical Electron Microscope HF-2200) at a 750000-fold magnification, and whether or not titanium carbide was present at the interface between the carbon layer and the titanium substrate was determined. When titanium carbide was present, an average size of titanium carbide grains was measured. As used herein the term "size (diameter)" of a titanium carbide grain, when being not spherical, refers to an arithmetic mean of a major axis and a minor axis of the grain. Also as used herein the term "average (grain) size" refers to an average of sizes of twenty grains of titanium carbide.

[Measurement of Coating Mass of Carbon]

The coating mass of carbon was measured by the procedure of First Experimental Example.

[Adhesion Evaluation]

Adhesion evaluation was performed with the contact resistance measuring instrument 40 illustrated in FIG. 4. Initially, a specimen 41 was sandwiched between two carbon cloths 42 and 42, outer sides of which were further sandwiched between two copper electrodes 43 and 43 each having a contact area of 1 cm², and the specimen was pressurized from both sides each with a load of 98 N (10 kgf). While being pressurized from both sides, the specimen 41 was pulled out in an in-plane direction (pull-out test).

A non-frictional surface and a frictional surface of the specimen after the pull-out test were observed with a scanning electron microscope with energy dispersive x-ray analysis (SEM/EDX) at a 100-fold magnification to quantitatively analyze titanium (Ti) and carbon (C) at an accelerating voltage of 15 kV. The carbon layer adhesion was judged in the following manner. A specimen having a carbon amount (atomic percent) of the frictional surface of 80% or more was judged as having very good adhesion (○); a specimen having a carbon amount of the frictional surface of 50% or more and less than 80% was judged as having good adhesion (Δ); and a specimen having a carbon amount of the frictional surface of less than 50% was judged as having poor adhesion (x), each relative to the carbon amount (100%) of the non-frictional surface.

Table 2 indicates preparation conditions of respective specimens, type of an intermediate layer, and results on average grain size (nm) of titanium carbide (TiC), coating mass of carbon (μg/cm²), and carbon layer adhesion.

TABLE 2

| Specimen number | Preparation conditions | | | Average grain size of TiC (nm) | Coating mass of carbon (μg/cm²) | Carbon layer adhesion | Remarks |
| --- | --- | --- | --- | --- | --- | --- | --- |
| | Rolling reduction (%) | Heat treatment | Intermediate layer | | | | |
| 1 | 75 | 700° C. for 5 min | TiC | 42 | 105 | ○ | Example |
| 11 | 30 | 600° C. for 5 min | TiC | 25 | 250 | ○ | Example |
| 12 | 3 | 650° C. for 10 min | TiC | 28 | 460 | Δ | Example |
| 13 | 75 | 400° C. for 10 min | TiC | 8 | 46 | ○ | Example |
| 14 | 50 | not performed | titanium oxide film | — | 22 | x | Comparative example |
| 15 | 60 | 150° C. for 30 min | titanium oxide film | — | 150 | x | Comparative example |

Specimens Nos. 1 and 11 to 13 each included an intermediate layer containing titanium carbide and thereby exhibited very good or good carbon layer adhesion. By contrast, Specimens Nos. 14 and 15 each included a titanium oxide film as an intermediate layer and thereby exhibited poor carbon layer adhesion.

The results in Table 2 demonstrate that adhesion of a carbon layer can be improved by performing a heat treatment at a temperature of 300° C. or higher after the formation of the carbon layer, so as to induce a reaction between the carbon layer and the titanium substrate to thereby form an intermediate layer including granular titanium carbide.

While the present invention has been described in detail with reference to the specific embodiments and examples thereof, it is obvious to those skilled in the art that various changes and modifications can be made in the invention without departing from the spirit and scope of the invention as hereinafter claimed. The present application is based on Japanese Patent Application No. 2010-163403 filed on Jul. 20, 2010, the entire contents of which are incorporated herein by reference.

REFERENCE SIGNS LIST

1 substrate
2 carbon layer
3 intermediate layer
3a titanium carbide
10 titanium fuel cell separator (separator)
21 (002) plane
22 (100) plane
23 graphite
24 graphene sheet
40 contact resistance measuring instrument
41 specimen
42 carbon cloth
43 copper electrode
44 direct-current power source
45 voltmeter

The invention claimed is:

1. A titanium fuel cell separator, comprising:
   a substrate consisting of pure titanium or a titanium alloy;
   a carbon layer and an intermediate layer between the substrate and the carbon layer, formed on a surface of the substrate,
   wherein the carbon layer has a peak intensity of the (002) plane as much as 3 times or more the peak intensity of a (100) plane, as measured by X-ray diffractometry, and
   wherein the carbon layer is present in a mass of coating of 2 μg/cm² or more,
   wherein the intermediate layer is formed through a reaction between the substrate and the carbon layer by a heat treatment and comprises titanium carbide in a form of grains ranging in a direction parallel to the carbon layer.

2. The titanium fuel cell separator of claim 1, wherein the carbon layer has an intensity ratio of G band peak to D band peak (G/D ratio) of 0.5 to 2, as measured by Raman spectroscopy.

3. A method for manufacturing the titanium fuel cell separator of claim 1, the method comprising:
   applying a carbon powder having a particle size of 0.5 to 100.0 μm to a surface of the substrate; and then,
   cold rolling to a rolling reduction of 0.1% or more, to form the carbon layer on the surface of the substrate, and
   a heat treatment performed in an atmosphere having an oxygen partial pressure of $1.3 \times 10^{-3}$ Pa or lower at a temperature of from 300° C. to 850° C. for a duration of 0.5 to 60 minutes, after the cold rolling step.

* * * * *